(12) United States Patent
Weng

(10) Patent No.: US 6,912,125 B2
(45) Date of Patent: Jun. 28, 2005

(54) COUPLING UNIT FOR COUPLING A DOCKING STATION TO A PORTABLE ELECTRONIC DEVICE

(75) Inventor: Shih-Lung Weng, Taipei Hsien (TW)

(73) Assignee: Wistron Corporation, Taipei Hsien (TW)

(*) Notice: Subject to any disclaimer, the term of this patent is extended or adjusted under 35 U.S.C. 154(b) by 203 days.

(21) Appl. No.: 10/460,121

(22) Filed: Jun. 11, 2003

(65) Prior Publication Data

US 2003/0231465 A1 Dec. 18, 2003

(30) Foreign Application Priority Data

Jun. 13, 2002 (TW) .......................................... 91112922 A
Oct. 28, 2002 (TW) .......................................... 91217265 U

(51) Int. Cl.⁷ ................................................. G06F 1/16
(52) U.S. Cl. ....................... 361/686; 439/341; 710/303; D14/434
(58) Field of Search ................................. 361/686, 683; 710/304; D14/434; 439/341

(56) References Cited

U.S. PATENT DOCUMENTS

| | | | | |
|---|---|---|---|---|
| 5,870,283 A | * | 2/1999 | Maeda et al. | 361/686 |
| 5,997,323 A | * | 12/1999 | Youn | 439/159 |
| 6,061,234 A | * | 5/2000 | Broder et al. | 361/686 |
| 6,264,488 B1 | * | 7/2001 | Helot et al. | 439/341 |
| 6,533,599 B1 | * | 3/2003 | Singleton, Jr. | 439/347 |
| 6,560,101 B1 | * | 5/2003 | Oross et al. | 361/686 |
| 6,744,627 B2 | * | 6/2004 | Won et al. | 361/686 |

* cited by examiner

Primary Examiner—Lisa Lea-Edmonds
(74) Attorney, Agent, or Firm—Ladas & Parry LLP

(57) ABSTRACT

A coupling unit for coupling a portable electronic device to a docking station includes a frame part mounted in the docking station and formed with an inclined rail member, and an engaging member that is slidable along the rail member between upper and lower ends of the rail member. The engaging member engages the portable electronic device when moved to the lower end of the rail member, and is disengaged from the portable electronic device when moved to the upper end of the rail member.

11 Claims, 11 Drawing Sheets

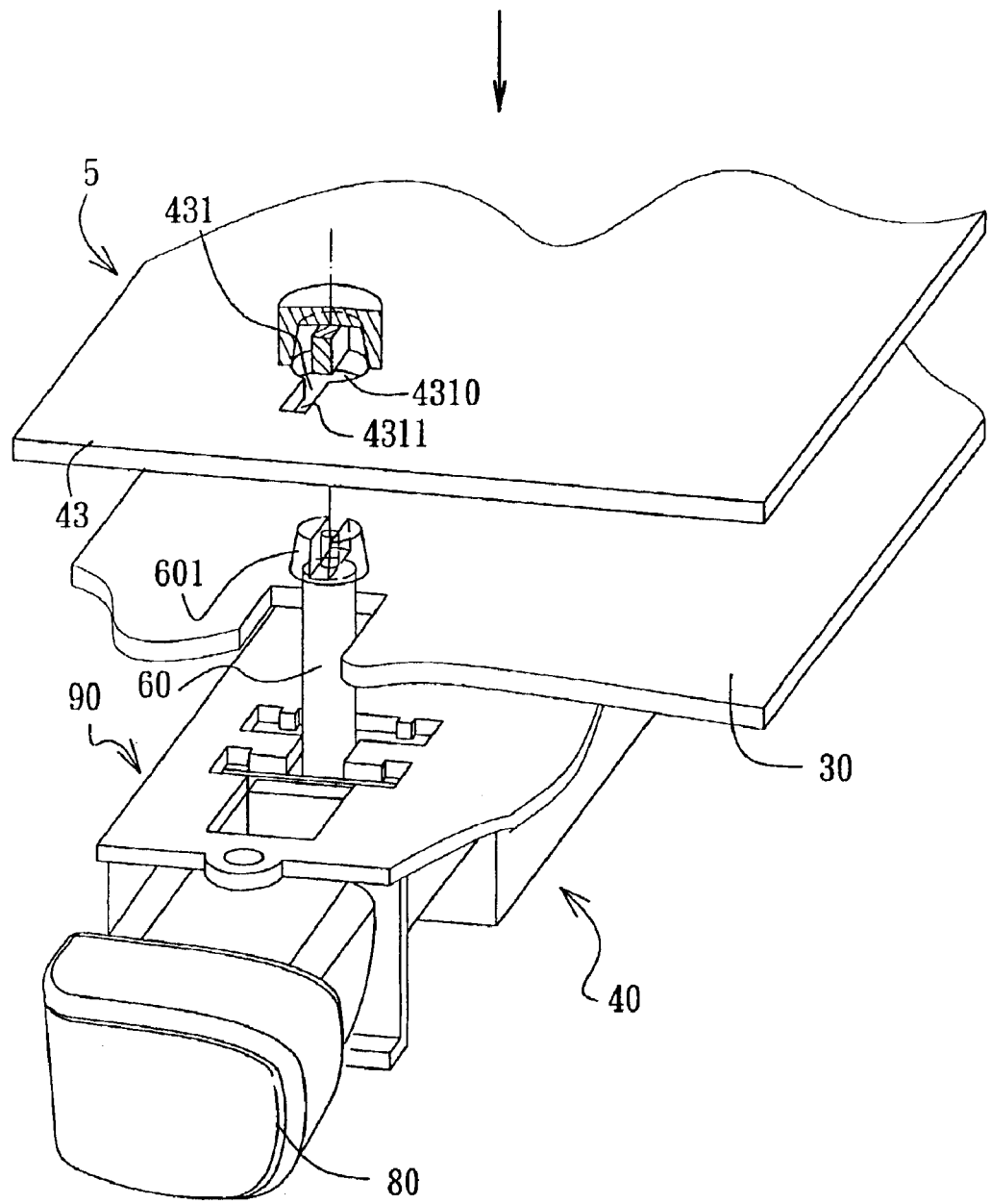
F I G. 9

COUPLING UNIT FOR COUPLING A DOCKING STATION TO A PORTABLE ELECTRONIC DEVICE

CROSS-REFERENCE TO RELATED APPLICATION

This application claims priority of Taiwanese Application No. 091112922, filed on Jun. 13, 2002, and Taiwanese Application No. 091217265, filed on Oct. 28, 2002.

BACKGROUND OF THE INVENTION

1. Field of the Invention

This invention relates to a coupling unit, more particularly to a coupling unit for coupling a docking station to a portable electronic device, such as a notebook computer.

2. Description of the Related Art

FIGS. 1 and 2 illustrate a conventional docking station for receiving a portable electronic device 100, such as a notebook computer, thereon. The docking station includes a housing 10 for receiving docking circuitry (not shown) therein so as to provide an interface between the portable electronic device 100 and peripheral equipment. A pair of positioning posts 11 project upwardly from a docking wall 101 of the docking station into positioning holes (not shown) in a bottom wall of a housing of the portable electronic device 100. A pair of latches 15 project upwardly from the docking wall 101 of the docking station into locking holes (not shown) in the bottom wall of the housing of the portable electronic device 100 for securing the portable electronic device 100 to the docking station.

The conventional docking station is disadvantageous in that a relatively large amount of holes are required to be formed in the housing of the portable electronic device 100 to permit mounting and securing of the portable electronic device 100 onto the docking station and that these holes span a relatively large area, which has an adverse effect on the reduction in the size of the portable electronic device 100.

SUMMARY OF THE INVENTION

Therefore, it is an object of the present invention to provide a coupling unit for a docking station that is capable of overcoming the aforementioned drawback of the prior art.

According to this invention, there is provided a coupling unit for docking a portable electronic device to a docking station that is vertically aligned with the portable electronic device along a vertical direction. The portable electronic device is formed with a first engaging member. The coupling unit is adapted to be mounted in the docking station, and comprises: an elongated frame part extending in a longitudinal direction that is adapted to be perpendicular to the vertical direction, having top and bottom ends, and formed with an inclined rail member that extends downwardly and inclinedly relative to the vertical direction and to the longitudinal direction from the top end to the bottom end of the frame part and that has upper and lower ends, the frame part including a base plate extending in the longitudinal direction and having two opposite sides, and a pair of parallel side plates extending upwardly and respectively from the opposite sides of the base plate, each of the side plates being formed with a pair of parallel inclined grooves and an inclined rail between the inclined grooves, the inclined rails of the side plates cooperatively defining the inclined rail member, each of the inclined grooves in the side plates of the frame part having a lower end, each of the side plates being further formed with a pair of lower recesses, each of which extends from the lower end of a respective one of the inclined grooves in the longitudinal direction; a second engaging member mounted slidably on the rail member so as to be slidable along the rail member between the upper and lower ends of the rail member, and including a sliding plate extending in the longitudinal direction, and an engaging post projecting upwardly from the sliding plate and adapted to extend outwardly through the docking station toward the portable electronic device to engage releasably the first engaging member of the portable electronic device when the second engaging member is positioned at the lower end of the rail member, the sliding plate having a first end with two opposite corners, and a second end opposite to the first end and having two opposite corners, the corners of the first and second ends of the sliding plate being respectively received in the lower recesses in the side plates when the second engaging member is positioned at the lower end of the rail member; a pair of first urging members, each of which has two opposite ends that are respectively connected to a respective one of the side plates of the frame part and a respective one of the opposite sides of the sliding plate in such a manner that the first urging members urge the corners of the first and second ends of the sliding plate to move into the lower recesses when the second engaging member is moved to the lower end of the rail member; and a releasing member that is operable to push the sliding plate against urging action of the first urging members so as to move the corners of the first and second ends of the sliding plate away from the lower recesses and so as to permit restoring of the second engaging member from the lower end of the rail member to the upper end of the rail member by urging action of the first urging members.

BRIEF DESCRIPTION OF THE DRAWINGS

In drawings which illustrate an embodiment of the invention,

FIG. 9 is a fragmentary perspective view to illustrate how an engaging member of the coupling unit of FIG. 3 engages a slot in a housing of the notebook personal computer;

DETAILED DESCRIPTION OF THE PREFERRED EMBODIMENT

Figure 1:
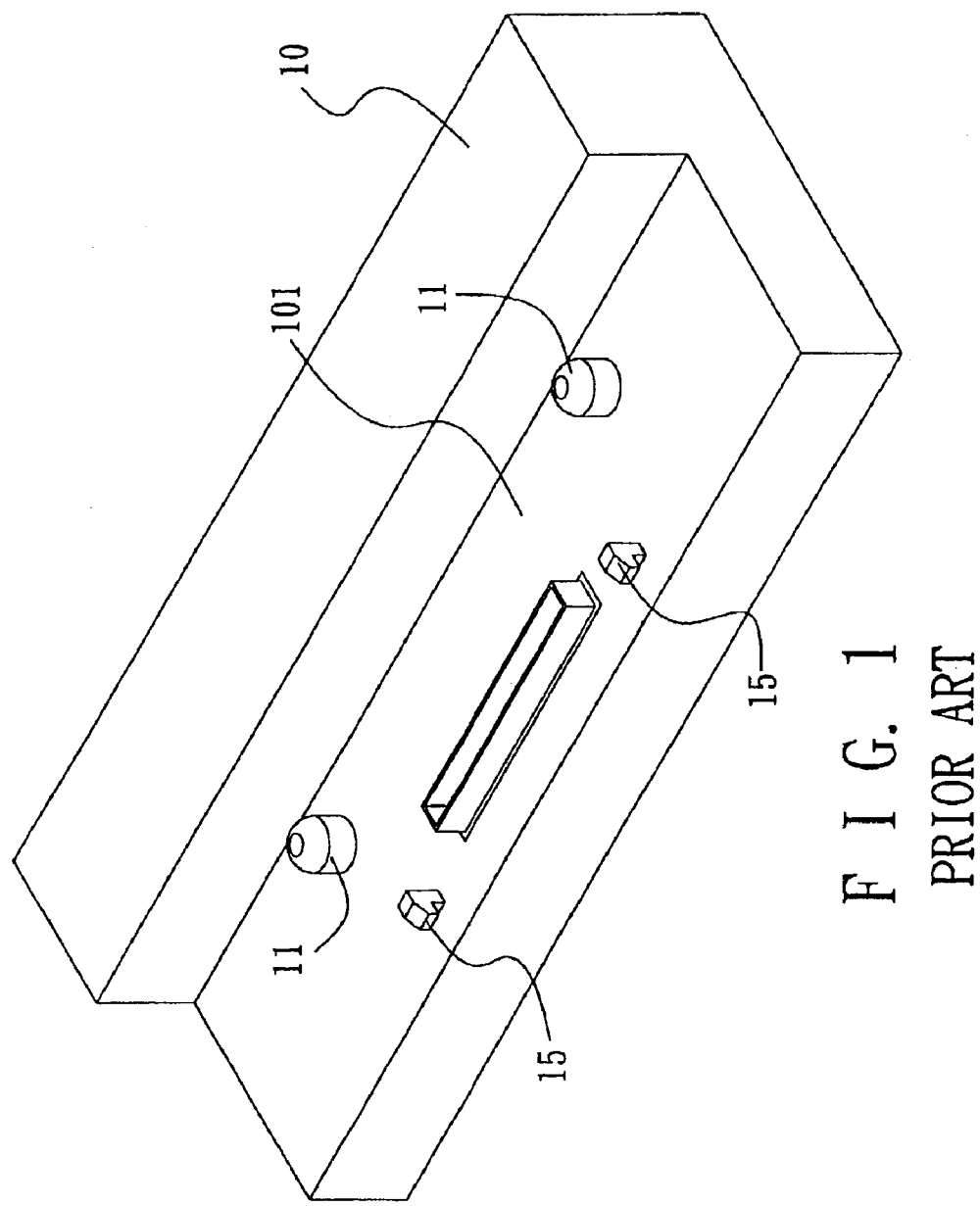
FIG. 1 is a perspective view of a conventional docking station for a notebook personal computer.
Figure 2:
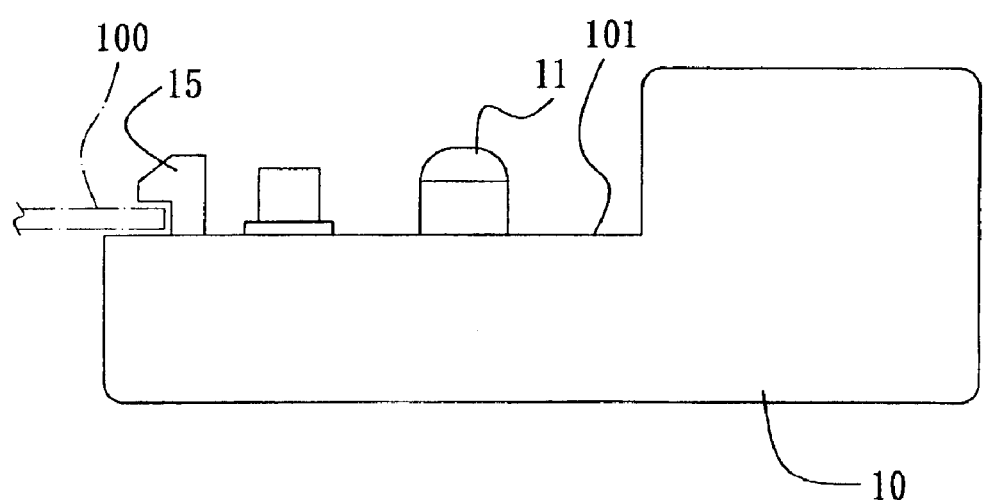
FIG. 2 is a side view to illustrate how the docking station of FIG. 1 is coupled to the notebook personal computer.
Figure 3:
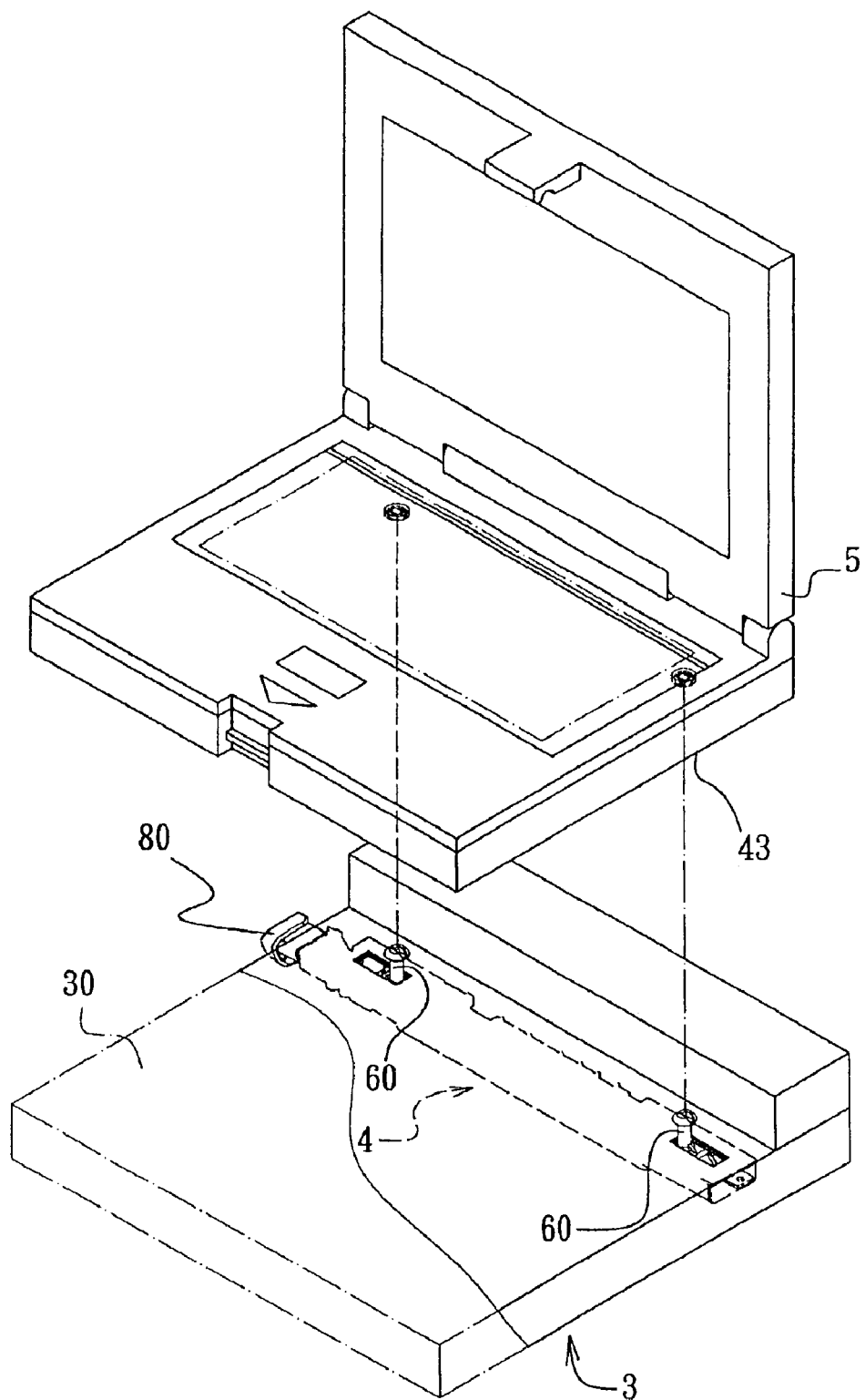
FIG. 3 is a perspective view of a docking station with a coupling unit embodying this invention for securing a notebook personal computer to the docking station.
Figure 4:
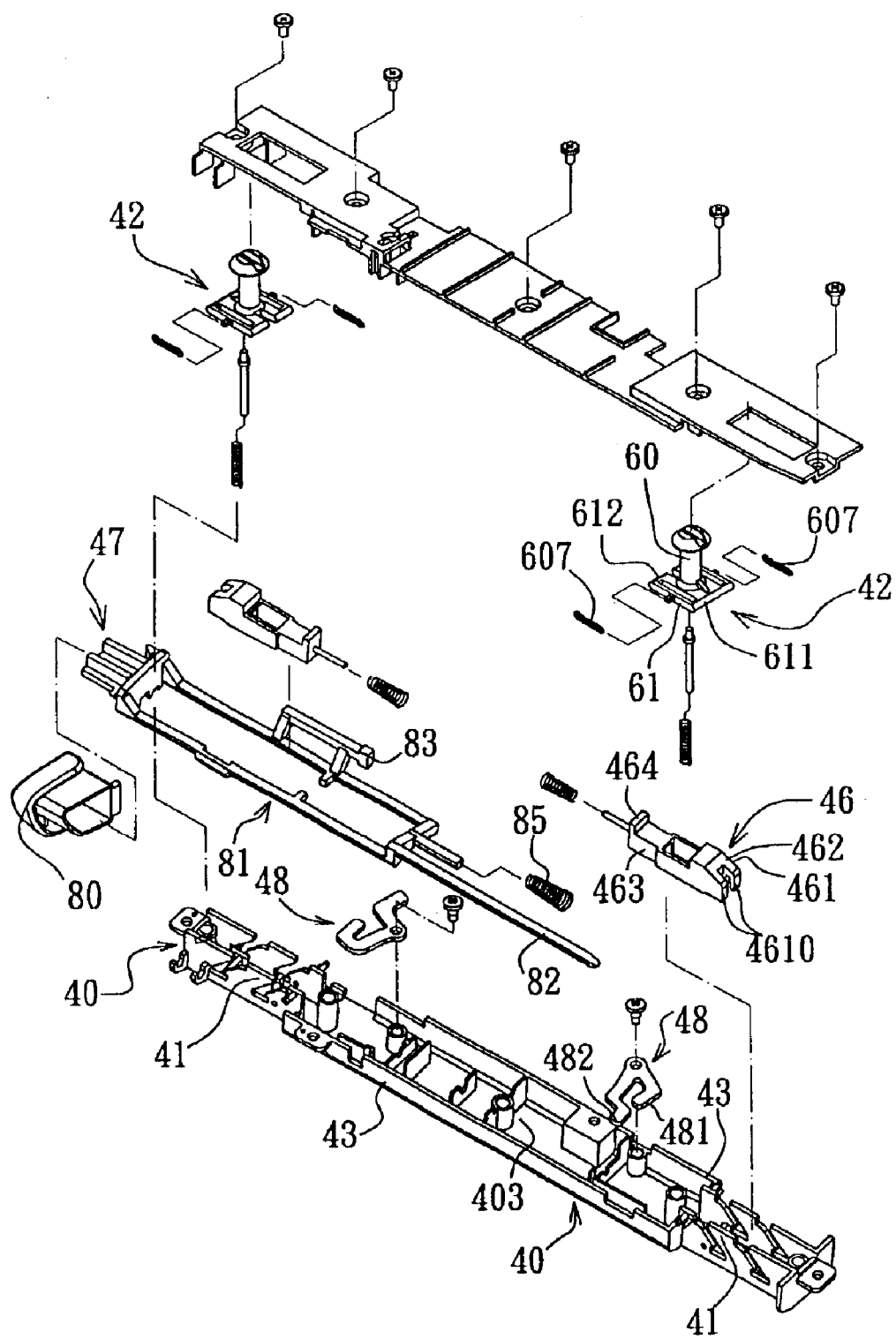
FIG. 4 is an exploded perspective view of the coupling unit of FIG. 3.
Figure 5:
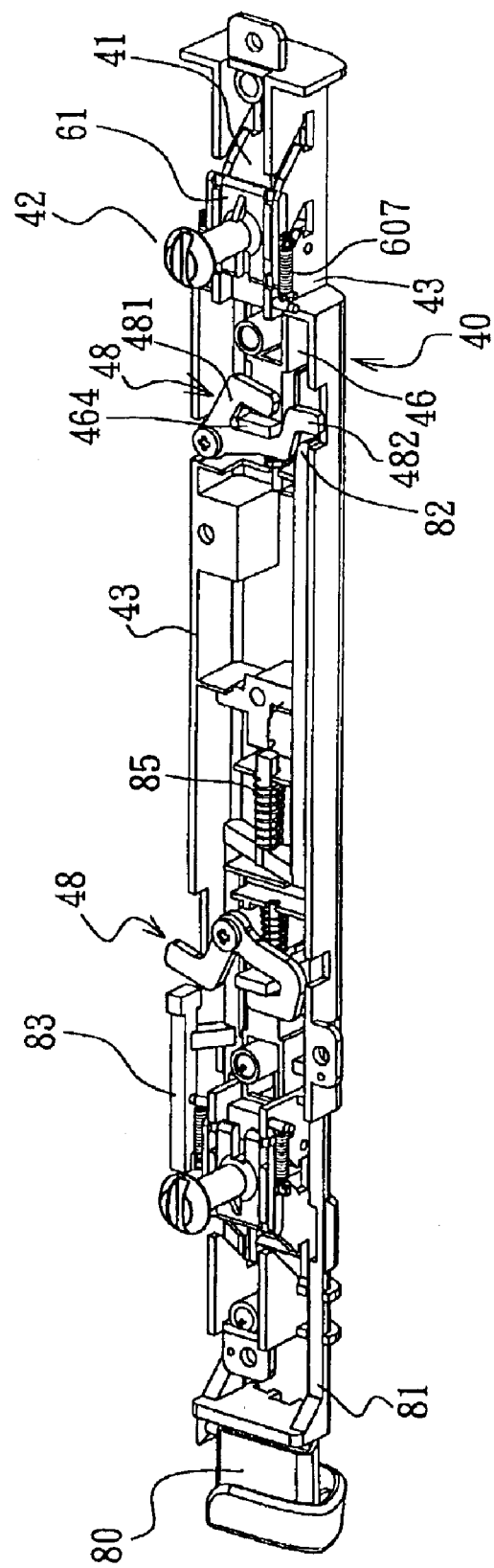
FIG. 5 is a perspective view of the assembled coupling unit of FIG. 3.
Figure 6:
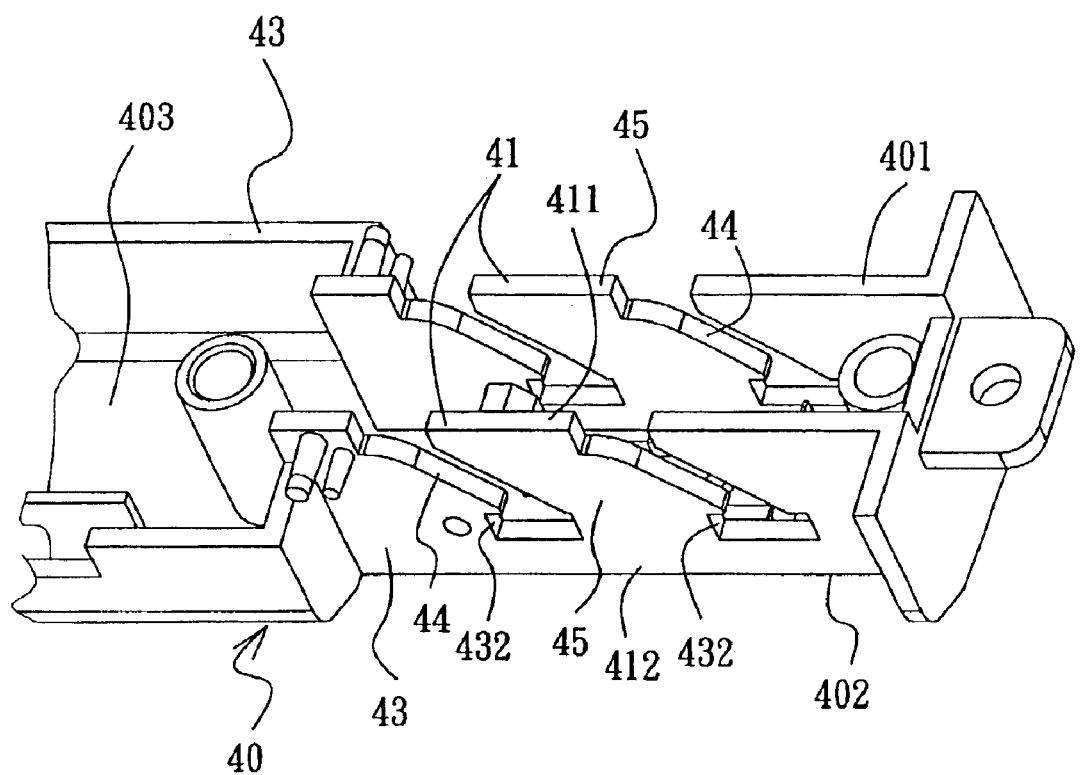
FIG. 6 is a fragmentary perspective view of a frame part of the coupling unit of FIG. 3.
Figure 7:
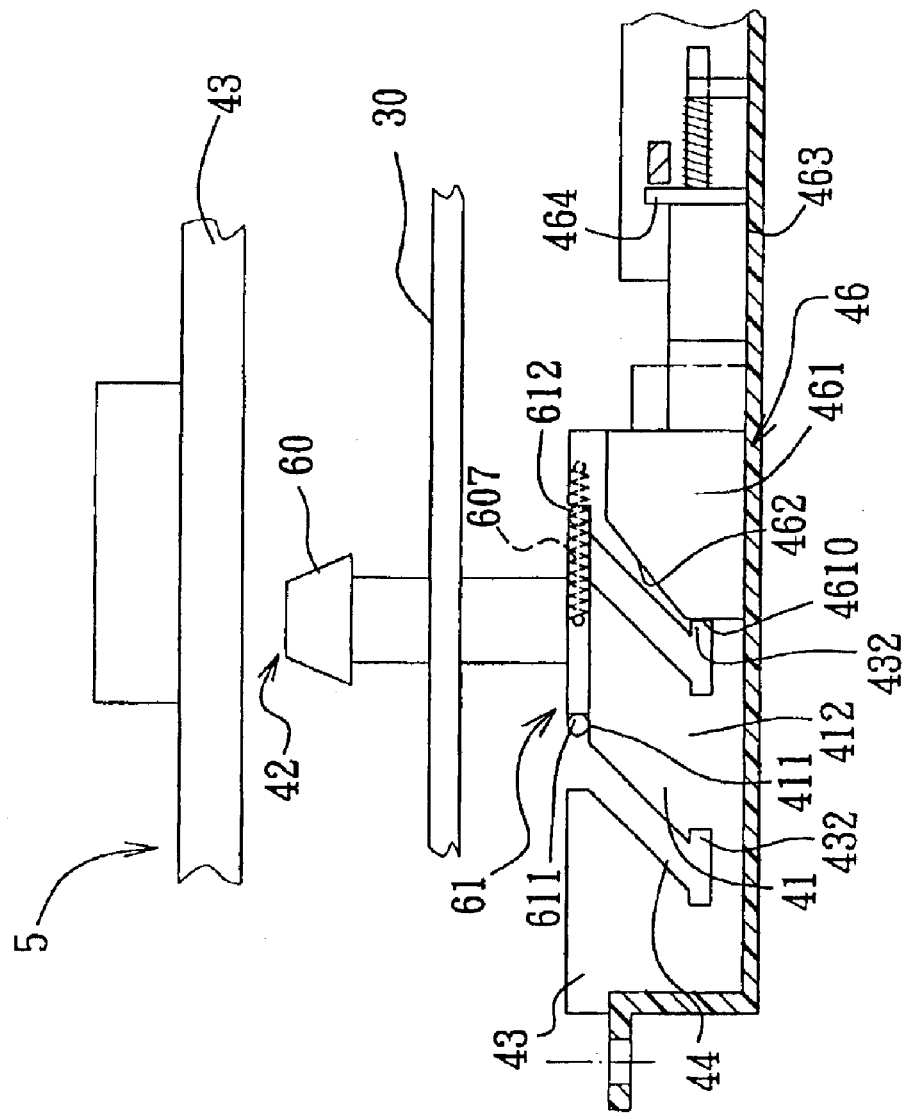
FIG. 7 is a fragmentary side view to illustrate how an engaging member is moved to an upper end of a rail member of the coupling unit of FIG. 3.
Figure 8:
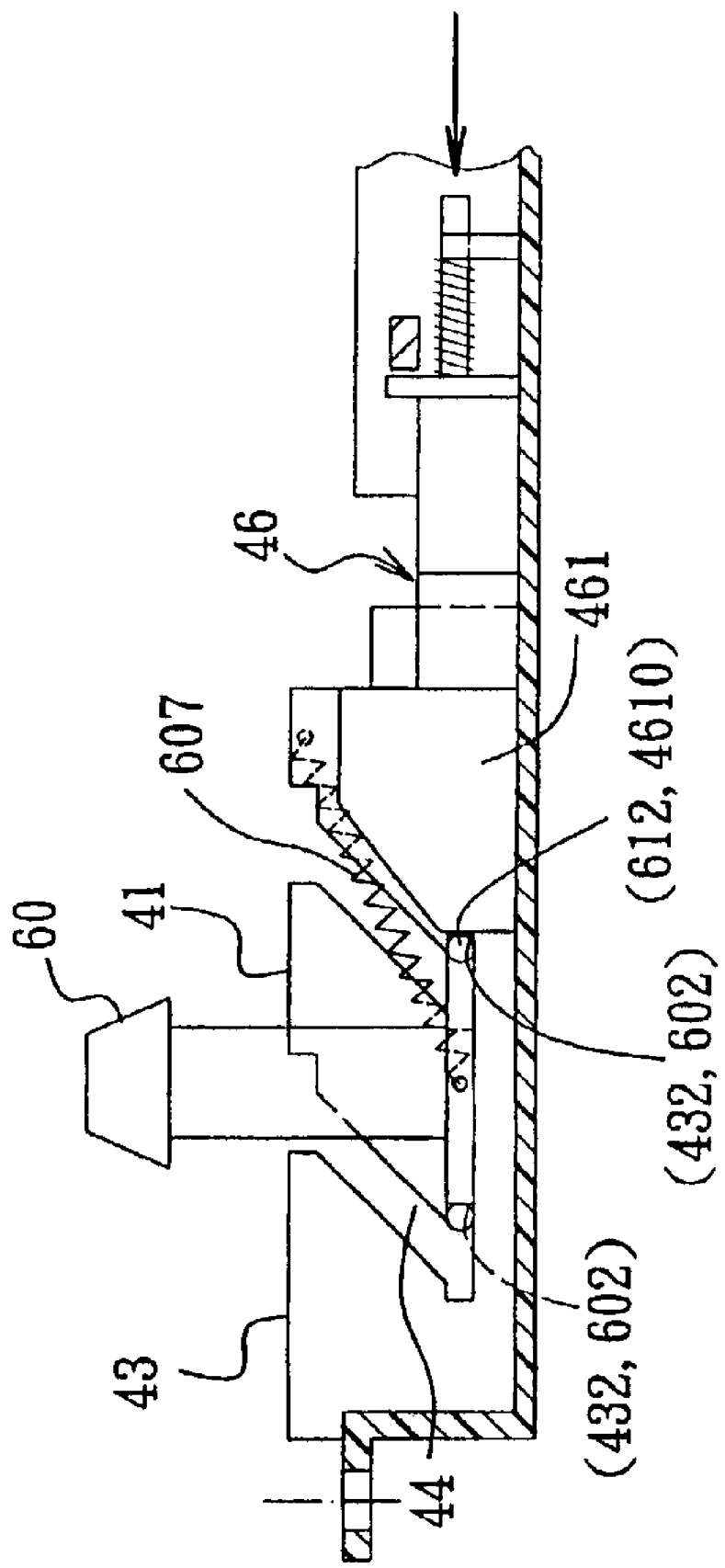
FIG. 8 is a fragmentary side view to illustrate how the engaging member of FIG. 7 is moved to a lower end of the rail member of the coupling unit of FIG. 3.
Figure 10:
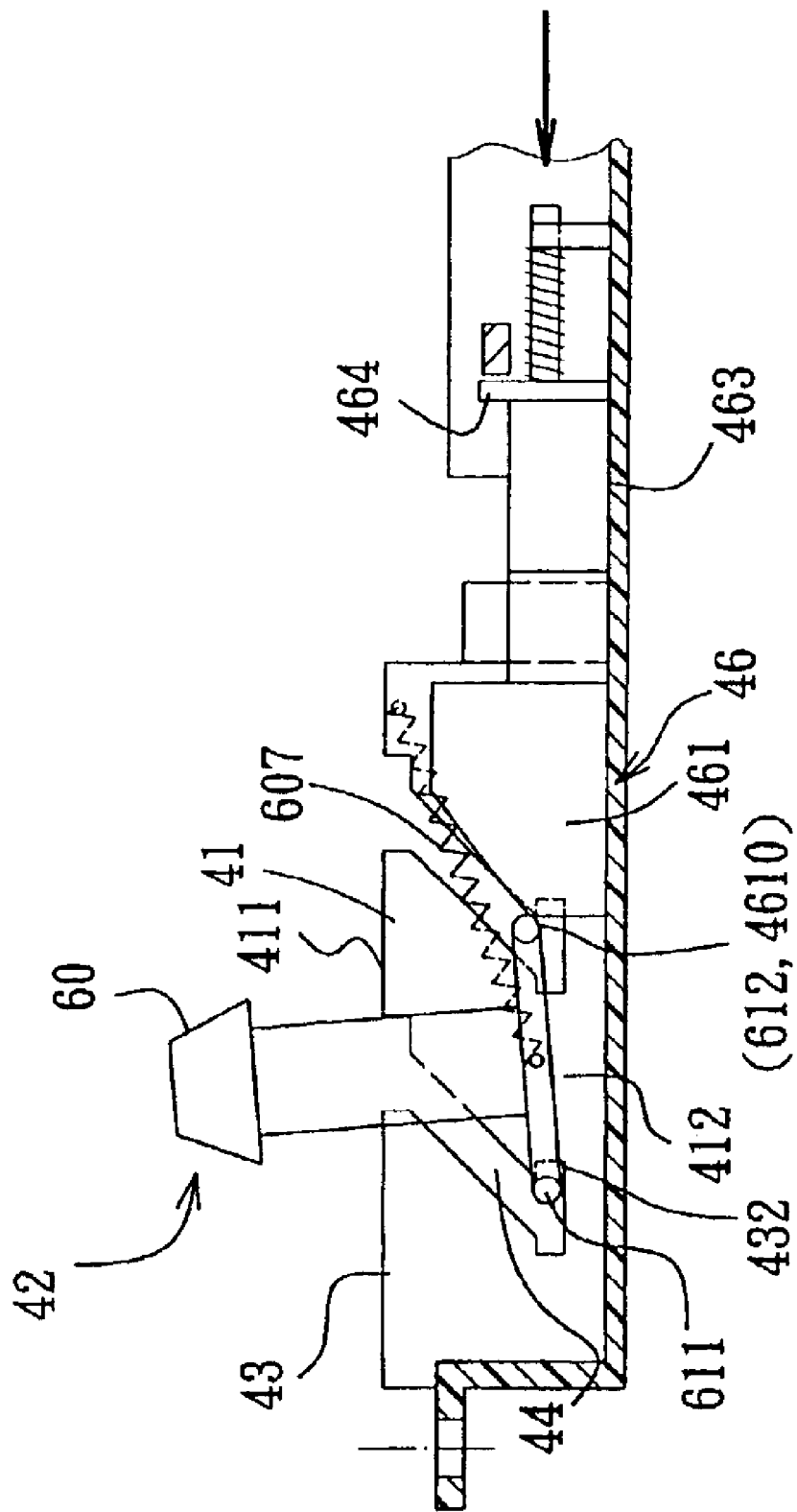
FIG. 10 is a fragmentary side view to illustrate how the engaging member of FIG. 8 is moved to a releasing position by an actuating member of a releasing member.
Figure 11:
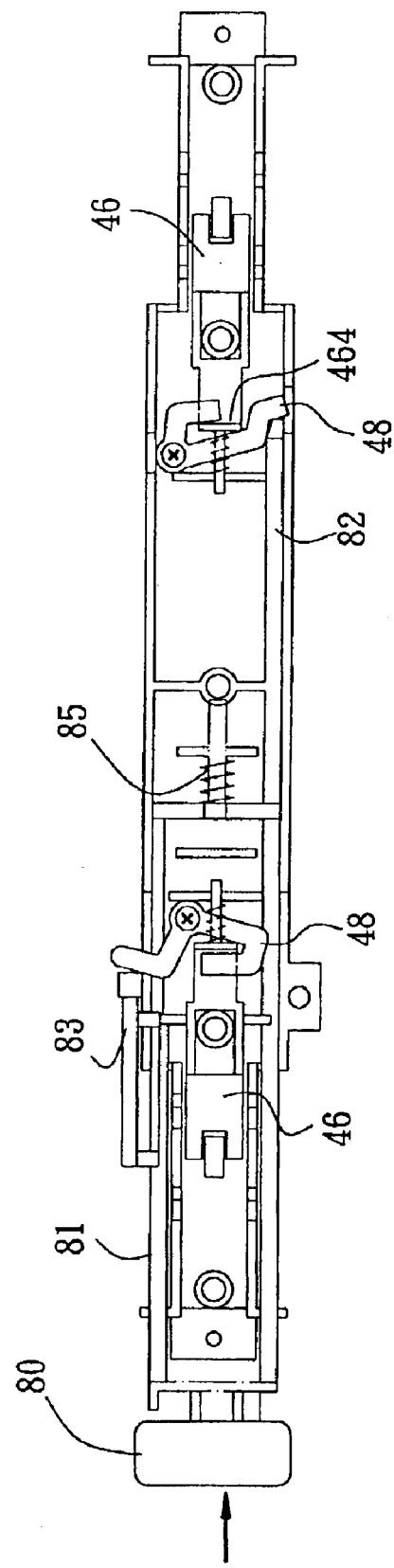
FIG. 11 is a top view to illustrate how the actuating member of FIG. 10 is moved by pressing a button.

FIGS. 3 to 11 illustrate a preferred embodiment of a coupling unit 4 of this invention for coupling a docking station 3 to a portable electronic device 5, such as a notebook personal computer. The coupling unit 4 is adapted to be mounted in the docking station 3. The portable electronic device 5 has a bottom mounting wall 43 (see FIG. 9) that is adapted to be mounted on a top docking wall 30 of the docking station 3. The portable electronic device 5 includes a first engaging member having an elongated slot 431 which is formed in the bottom mounting wall 43, which extends in a longitudinal direction, and which has an enlarged end 4310 and an extension 4311 extending and reduced from the enlarged end 4310 in the longitudinal direction. The docking station 3 is vertically aligned with the portable electronic device 5 along a vertical direction that is perpendicular to the longitudinal direction.

The coupling unit 4 includes a first half and a second half which extends from and which is opposite to the first half and which has the same structure as that of the first half. Each of the first and second halves of the coupling unit 4 includes: an elongated frame part 40 extending in a longitudinal direction that is adapted to be perpendicular to the vertical direction, having top and bottom ends 401, 402 (see FIG. 6), and formed with an inclined rail member 41 that extends downwardly and inclinedly relative to the vertical direction and to the longitudinal direction from the top end 401 to the bottom end 402 of the frame part 40 and that has upper and lower ends 411, 412, the frame part 40 including a base plate 403 extending in the longitudinal direction and having two opposite sides, and a pair of parallel side plates 43 extending upwardly and respectively from the opposite sides of the base plate 403, each of the side plates 43 being formed with a pair of parallel inclined grooves 44 and an inclined rail 45 between the inclined grooves 44, the inclined rails 45 of the side plates 43 cooperatively defining the inclined rail member 41, each of the inclined grooves 44 in the side plates 34 of the frame part 40 having a lower end, each of the side plates 43 being further formed with a pair of lower recesses 432, each of which extends from the lower end of a respective one of the inclined grooves 44 in the longitudinal direction; a second engaging member 42 mounted slidably on the rail member 41 so as to be slidable along the rail member 41 between the upper and lower ends 411, 412 of the rail member 41 (see FIGS. 7 and 8), and including a sliding plate 61 extending in the longitudinal direction, and an engaging post 60 projecting upwardly from the sliding plate 61 and adapted to extend outwardly through the docking station 3 and into the elongated slot 431 (see FIG. 9) to engage releasably the extension 4311 of the elongated slot 431 when the second engaging member 42 is positioned at the lower end 412 of the rail member 41, the sliding plate 61 having a first end 611 with two opposite corners 602, and a second end 622 opposite to the first end 611 and having two opposite corners 602, the corners 602 of the first and second ends 611, 612 of the sliding plate 61 being respectively received in the lower recesses 432 in the side plates 43 (see FIG. 8) when the second engaging member 42 is positioned at the lower end 412 of the rail member 41; a pair of first urging members 607, each of which has two opposite ends that are respectively connected to a respective one of the side plates 43 of the frame part 40 and a respective one of the opposite sides of the sliding plate 61 in such a manner that the first urging members 607 urge the corners 602 of the first and second ends 611, 612 of the sliding plate 61 to move into the lower recesses 432 when the second engaging member 42 is moved to the lower end 412 of the rail member 41; and a releasing member 47 that is operable to push the sliding plate 61 against urging action of the first urging members 607 so as to move the corners 602 of the first and second ends 611, 612 of the sliding plate 61 away from the lower recesses 432 (see FIG. 10) and so as to permit restoring of the second engaging member 42 from the lower end 412 of the rail member 41 to the upper end 411 of the rail member 41 by urging action of the first urging members 607. The engaging post 60 is vertically aligned with the enlarged end 4310 of the slot 431 when the second engaging member 42 is moved to the upper end 411 of the rail member 41, thereby permitting removal of the portable electronic device 5 from the docking station 3.

The releasing member 47 of each of the first and second halves of the coupling unit 4 includes an actuating member 46 that is disposed movably between the side plates 43 of the frame part 40 adjacent to the second end 612 of the sliding plate 61, and that has an actuating end 461 with an abutting end face 4610 which extends in a transverse direction relative to the base plate 403, and which is in contact with the second end 612 of the sliding plate 61 when the second engaging member 42 is positioned at the lower end 412 of the rail member 41 so that movement of the actuating member 42 in the longitudinal direction from a non-releasing position (see FIG. 8) to a releasing position (see FIG. 10) results in movement of the corners 602 of the first and second ends 611, 612 of the sliding plate 61 away from the lower recesses 432.

The actuating end 461 of the actuating member 46 has an inclined upper face 462 that extends inclinedly and upwardly from the abutting end face 4610 and that is vertically aligned with and that is disposed underneath the second end 612 of the sliding plate 61 (see FIG. 7) when the second engaging member 42 is positioned at the upper end 411 of the rail member 41. The second end 612 of the sliding plate 61 slides over the inclined upper face 462 of the actuating end 461 of the actuating member 46 when the second engaging member 42 is moved from the upper end 411 of the rail member 41 to the lower end 412 of the rail member 41 so as to guide sliding movement of the second engaging member 42.

The actuating member 46 further includes a driven end 463 that is opposite to the actuating end 461 and that is formed with a protrusion 464 projecting upwardly therefrom. The releasing member 47 further includes a driving part 48 that is mounted pivotally on the frame part 40 and that has a hook end 481 which engages the protrusion 464. The driving part 48 is rotatable for moving the actuating member 46 between the releasing and non-releasing positions.

The driving part 48 has a driven end 482 opposite to the hook end 481. A button 80 is mounted on an exterior of the frame part 40 of one of the first and second halves. An extending part 81 extends from the button 80 in the longitudinal direction, and has first and second pushing arms 82, 83 which extend respectively toward the driven ends 482 of the driving parts 48 of the first and second halves. The button 80 is operable to move the pushing arms 82, 83 of the extending part 81 in the longitudinal direction to drive the driven ends 482 of the driving parts 48, which, in turn, results in movement of the actuating member 46 from the non-releasing position to the releasing position (see FIG. 11), thereby permitting sliding movement of the second engaging member 42 of each of the first and second halves from the lower end 412 of the rail member 41 to the upper end 411 of the rail member 41. A second urging member 85 abuts against the extending part 81 for restoring the extending part 81 and the button 80 to their normal positions.

Since the second engaging member 42 of the coupling unit 4 of this invention is capable of positioning and securing the portable electronic device 5 to the docking station 3 without forming a large amount of holes in the housing of the portable electronic device 5, the aforesaid drawback as encountered in the prior art can be eliminated.

With the invention thus explained, it is apparent that various modifications and variations can be made without departing from the spirit of the present invention.

I claim:

1. A coupling unit for docking a portable electronic device to a docking station that is vertically aligned with the portable electronic device along a vertical direction, the portable electronic device being formed with a first engaging member, said coupling unit being adapted to be mounted in the docking station and comprising:

an elongated frame part extending in a longitudinal direction that is adapted to be perpendicular to the vertical direction, having top and bottom ends, and formed with an inclined rail member that extends downwardly and inclinedly relative to the vertical direction and to the longitudinal direction from said top end to said bottom end of said frame part and that has upper and lower ends, said frame part including a base plate extending in the longitudinal direction and having two opposite sides, and a pair of parallel side plates extending upwardly and respectively from said opposite sides of said base plate, each of said side plates being formed with a pair of parallel inclined grooves and an inclined rail between said inclined grooves, said inclined rails of said side plates cooperatively defining said inclined rail member, each of said inclined grooves in said side plates of said frame part having a lower end, each of said side plates being further formed with a pair of lower recesses, each of which extends from said lower end of a respective one of said inclined grooves in the longitudinal direction;

a second engaging member mounted slidably on said rail member so as to be slidable along said rail member between said upper and lower ends of said rail member, and including a sliding plate extending in the longitudinal direction, and an engaging post projecting upwardly from said sliding plate and adapted to extend outwardly through the docking station toward the portable electronic device to engage releasably the first engaging member of the portable electronic device when said second engaging member is positioned at said lower end of said rail member, said sliding plate having a first end with two opposite corners, and a second end opposite to said first end and having two opposite corners, said corners of said first and second ends of said sliding plate being respectively received in said lower recesses in said side plates when said second engaging member is positioned at said lower end of said rail member;

a pair of first urging members, each of which has two opposite ends that are respectively connected to a respective one of said side plates of said frame part and a respective one of said opposite sides of said sliding plate in such a manner that said first urging members urge said corners of said first and second ends of said sliding plate to move into said lower recesses when said second engaging member is moved to said lower end of said rail member; and a releasing member that is operable to push said sliding plate against urging action of said first urging members so as to move said corners of said first and second ends of said sliding plate away from said lower recesses and so as to permit restoring of said second engaging member from said lower end of said rail member to said upper end of said rail member by urging action of said first urging members.

2. The coupling unit of claim 1, wherein said releasing member includes an actuating member that is disposed movably between said side plates of said frame part adjacent to said second end of said sliding plate, and that has an actuating end with an abutting end face which extends in a transverse direction relative to said base plate, and which is in contact with said second end of said sliding plate when said second engaging member is positioned at said lower end of said rail member so that movement of said actuating member in the longitudinal direction from a non-releasing position to a releasing position results in movement of said corners of said first and second ends of said sliding plate away from said lower recesses.

3. The coupling unit of claim 2, wherein said actuating end of said actuating member has an inclined upper face that extends inclinedly and upwardly from said abutting end face and that is vertically aligned with and that is disposed underneath said second end of said sliding plate when said second engaging member is positioned at said upper end of said rail member, said second end of said sliding plate sliding over said inclined upper face of said actuating member when said second engaging member is moved from said upper end of said rail member to said lower end of said rail member so as to guide sliding movement of said second engaging member.

4. A coupling unit for docking a portable electronic device to a docking station that is vertically aligned with the portable electronic device along a vertical direction, the portable electronic device being formed with a first engaging member, said coupling unit being adapted to be mounted in the docking station and comprising:

a first half and a second half extending from and opposite to said first half, each of said first and second halves including an elongated frame part extending in a longitudinal direction that is adapted to be perpendicular to the vertical direction, having top and bottom ends, and formed with an inclined rail member that extends downwardly and inclinedly relative to the vertical direction and to the longitudinal direction from said top end to said bottom end of said frame part and that has upper and lower ends, said frame part including a base plate extending in the longitudinal direction and having two opposite sides, and a pair of parallel side plates extending upwardly and respectively from said opposite sides of said base plate, each of said side plates being formed with a pair of parallel inclined grooves and an inclined rail between said inclined grooves, said inclined rails of said side plates cooperatively defining said inclined rail member, each of said inclined grooves in said side plates of said frame part having a lower end, each of said side plates being further formed with a pair of lower recesses, each of which extends from said lower end of a respective one of said inclined grooves in the longitudinal direction, a second engaging member mounted slidably on said rail member so as to be slidable along said rail member between said upper and lower ends of said rail member, and including a sliding plate extending in the longitudinal direction, and an engaging post projecting upwardly from said sliding plate and adapted to extend outwardly through the docking station toward the portable electronic device to engage releasably the first engaging member of the portable electronic device when said second engaging member is positioned at said lower end of said rail member, said sliding plate having a first end with two opposite corners, and a second end opposite to said first end and having two opposite corners, said corners of said first and second ends of said sliding plate being respectively received in said lower recesses in said side plates when said second engaging member is positioned at said lower end of said rail member, a pair of first urging members, each of which has two opposite ends that are respectively connected to a respective one of said side plates of said frame part and a respective one of said opposite sides of said sliding plate in such a manner that said first urging members urge said corners of said first and second ends of said sliding plate to move into said lower recesses when said second engaging member is moved to said lower end of said rail member, and a releasing member that is operable to push said sliding plate against urging action of said first urging members so as to move said corners of said first and second ends of said sliding plate of said second engaging member of each of said first and second halves away from said lower recesses and so as to permit restoring of said second engaging member from said lower end of said rail member to said upper end of said rail member by urging action of said first urging members.

5. The coupling unit of claim 4, wherein said releasing member includes an actuating member that is disposed movably between said side plates of said frame part adjacent to said second end of said sliding plate, and that has an actuating end with an abutting end face which extends in a transverse direction relative to said base plate, and which is in contact with said second end of said sliding plate when said second engaging member is positioned at said lower end of said rail member so that movement of said actuating member in the longitudinal direction from a non-releasing position to a releasing position results in movement of said corners of said first and second ends of said sliding plate away from said lower recesses.

6. The coupling unit of claim 5, wherein said actuating end of said actuating member has an inclined upper face that extends inclinedly and upwardly from said abutting end face and that is vertically aligned with and that is disposed underneath said second end of said sliding plate when said second engaging member is positioned at said upper end of said rail member, said second end of said sliding plate sliding over said inclined upper face of said actuating end of said actuating member when said second engaging member is moved from said upper end of said rail member to said lower end of said rail member so as to guide sliding movement of said second engaging member.

7. The coupling unit of claim 6, wherein said actuating member further includes a driven end that is opposite to said actuating end and that is formed with a protrusion projecting upwardly therefrom, said releasing member further including a driving part that is mounted pivotally on said frame part and that has a hook end which engages said protrusion, said driving part being rotatable for moving said actuating member between said releasing and non-releasing positions.

8. The coupling unit of claim 7, wherein said driving part has a driven end opposite to said hook end, said coupling unit further comprising a button that is mounted on an exterior of said frame part of one of said first and second halves, and an extending part that extends from said button in the longitudinal direction and that has first and second pushing arms which extend respectively toward said driven ends of said driving parts of said first and second halves, said button being operable to move said pushing arms of said extending part in the longitudinal direction to drive said driven ends of said driving parts, which, in turn, results in movement of said actuating member from said non-releasing position to said releasing position, thereby permitting sliding movement of said second engaging member of each of said first and second halves from said lower end of said rail member to said upper end of said rail member.

9. A coupling unit adapted to be mounted in a docking station for coupling the docking station to a device, said coupling unit comprising:

an elongated frame part, extending in a longitudinal direction, having top and bottom ends, and two parallel side plates which extend from said top end to said bottom end of said frame part and which cooperates with each other to form an inclined rail member, said rail member extending downwardly and inclinedly relative to a vertical direction from said top end to said bottom end of said frame part, and having upper and lower ends, said side plates being formed with a pair of opposite recesses that extend in said longitudinal direction;

an engaging member mounted slidably on said rail member, slidable along said rail member between said upper and lower ends of said rail member, and including a sliding plate extending in the longitudinal direction, and an engaging post projecting upwardly from said sliding plate and adapted to extend outwardly through the docking station so as to engage releasably the device when said engaging member is slid to said lower end of said rail member, said sliding plate having an end that is received in and that releasably engages said recesses when said engaging member is slide to said lower end of said rail member so as to prevent sliding movement of said engaging member; and a releasing member that is operable to move said sliding plate in said longitudinal direction away from said recesses so as to permit disengagement of said end of said sliding plate from said recesses and so as to permit sliding movement of said engaging member from said lower end of said rail member to said upper end of said rail member.

10. The coupling unit of claim 9, wherein said releasing member includes an actuating member that is disposed movably between said side plates of said frame part adjacent to said end of said sliding plate, and that has an actuating end which is in contact with said end of said sliding plate when said engaging member is slid to said lower end of said rail member so that movement of said actuating member in said longitudinal direction from a non-releasing position to a releasing position results in disengagement of said end of said sliding plate from said recesses.

11. The coupling unit of claim 10, wherein said actuating end of said actuating member has an inclined upper face that extends inclinedly relative to said vertical direction and that is vertically aligned with and that is disposed underneath said end of said sliding plate when said engaging member is slid to said upper end of said rail member, said end of said sliding plate sliding over said inclined upper face of said actuating member when said engaging member is moved from said upper end of said rail member to said lower end of said rail member.

* * * * *